March 15, 1960     R. BERGSMA     2,928,958
THERMAL MOTOR
Filed Dec. 17, 1954     5 Sheets-Sheet 1

INVENTOR.
Rudolph Bergsma
BY
Harness, Dickey & Pierce.
ATTORNEYS.

March 15, 1960    R. BERGSMA    2,928,958
THERMAL MOTOR

Filed Dec. 17, 1954    5 Sheets-Sheet 2

INVENTOR.
Rudolph Bergsma.
BY
Harness, Dickey & Pierce
ATTORNEYS.

March 15, 1960  R. BERGSMA  2,928,958
THERMAL MOTOR
Filed Dec. 17, 1954  5 Sheets-Sheet 3

INVENTOR.
*Rudolph Bergsma*
BY
*Harness, Dickey & Pierce.*
ATTORNEYS.

INVENTOR.
Rudolph Bergsma
BY
Harness, Dickey & Pierce
ATTORNEYS.

March 15, 1960 R. BERGSMA 2,928,958
THERMAL MOTOR
Filed Dec. 17, 1954 5 Sheets-Sheet 5

INVENTOR.
Rudolph Bergsma
BY
Harness, Dickey & Pierce
ATTORNEYS.

United States Patent Office 2,928,958
Patented Mar. 15, 1960

2,928,958

THERMAL MOTOR

Rudolph Bergsma, Ann Arbor, Mich., assignor to King-Seeley Corporation, Ann Arbor, Mich., a corporation of Michigan Application December 17, 1954, Serial No. 475,998

5 Claims. (Cl. 310—4)

This invention relates to thermal motors, and more particularly to motors adapted for use in operating such devices as toaster bread carriages or the like. This application is related to my application Serial No. 466,173, filed November 1, 1954.

It is an object of the invention to provide an improved thermal motor which is controllable by a timing or condition-responsive device and which operates by expansion and contraction of electrical conducting wires to move an object from the position which it occupies during a treatment cycle.

It is another object to provide an improved thermal motor of this character which is especially adapted for use with heating apparatus such as bread toasters, and in which the thermal motor is separate from the heat supplying elements. In this connection, the invention contemplates the provision of a thermal motor in which the motor wires are at no time subjected to relatively high temperatures, thus making available a higher proportion of the tensile strength of the wires for supplying motive force.

It is also an object to provide an improved thermal motor having the above properties, in which the motor wires are kept at all times in a taut condition, thus preventing the harmful effects of repeated sagging of the wires.

It is a further object to provide an improved thermal motor of the above nature, which is readily connectible with the operating linkage of a device such as an automatic toaster, and in which the motor is so shaped as to be installable within the confines of a toaster chassis.

It is another object to provide a thermal motor of the above character, which includes means for limiting the stress which can be placed upon the motor wires, thus eliminating the danger of wire breakage should an obstruction prevent lifting of the bread carriage.

It is also an object to provide an improved thermal motor in which the wires are so arranged that a maximum proportion of their tensile strength at each temperature level during their expansion and contraction is available for motive force. In this connection, it is the purpose of the invention to reduce the stress placed on the wires as they are heated, thus compensating for the decreased tensile strength of the wires in their hot condition and avoiding a constant-stress cycle which would reqiure that the wires be substantially understressed in their cold condition.

Other objects, features, and advantages of the present invention will become apparent from the subsequent description, taken in conjunction with the accompanying drawings.

Figure 1:
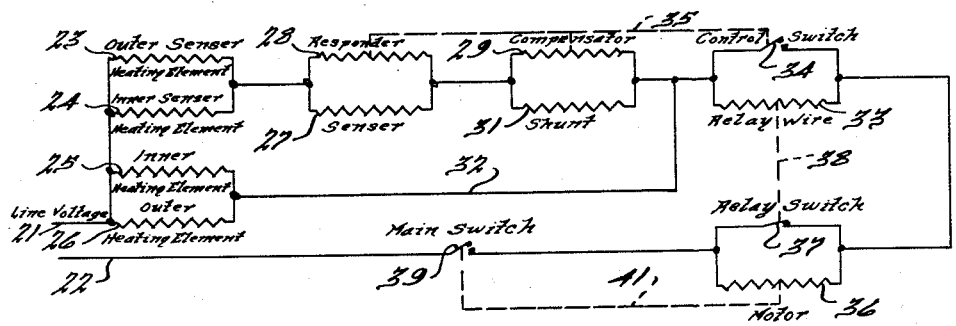
Figure 1 is a schematic electrical circuit diagram of a toaster mechanism embodying the thermal motor of this invention.
Figure 2:
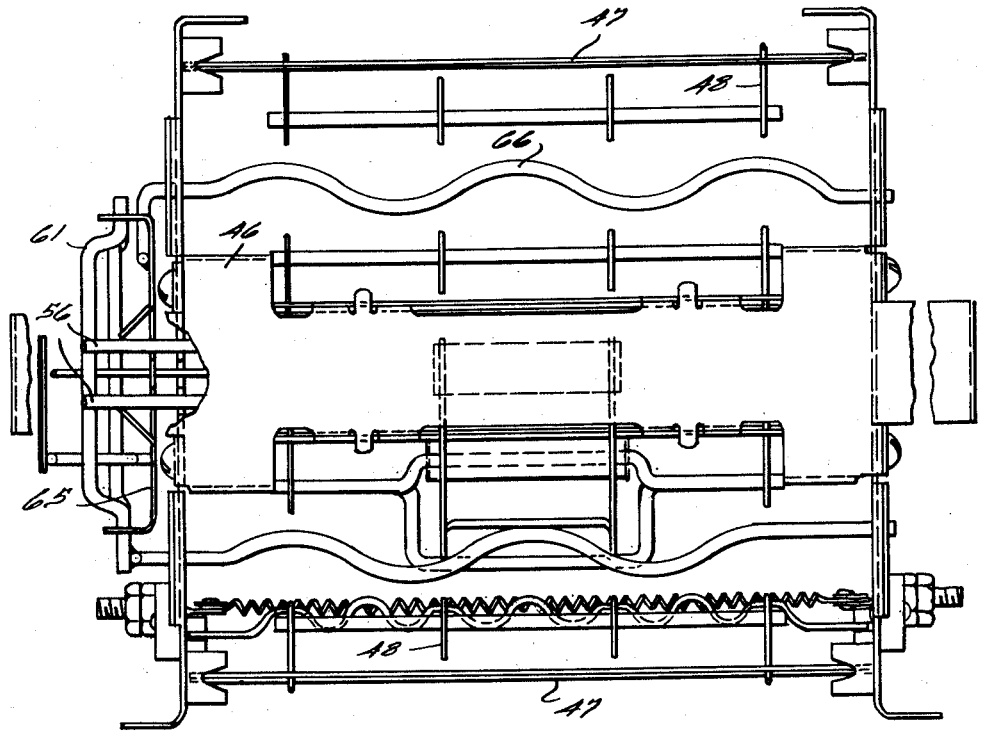
Figure 2 is a top plan view, parts being broken away for clarity, of a toaster chassis employing a thermal motor of this invention.

The toaster circuit shown in Figure 1, which is illustrative of those with which the novel thermal motor may be employed, has the same basic arrangement as that shown in application Serial No. 317,220 of Emil E. Sivacek, filed October 28, 1952, now Patent No. 2,750,873, issued June 19, 1956, and Serial No. 466,173 of Rudolph Bergsma, filed November 1, 1954, both applications being assigned to the present assignee. The circuit comprises a pair of supply leads 21 and 22 and a plurality of parallel heating elements 23, 24, 25 and 26. The toaster is arranged to toast two slices of bread simultaneously, with heating elements 23 and 26 being the outer heating elements of the two chambers and elements 24 and 25 being the inner heating elements. A senser 27 and a responder 28 are connected in series with heating elements 23 and 24 and in parallel with each other. Also in series with heating elements 23 and 24 and with elements 27 and 28 are a compensator 29 and a shunt 31, these last two elements being in parallel with each other. Heating elements 25 and 26 are connected by a lead 32 to the other side of compensator 29 and shunt 31.

In series with the above-mentioned elements is a relay wire 33 which is controlled by a shunt switch 34. Switch 34 is normally open but is closed at the beginning of a toasting cycle and is opened at the termination of the cycle to cause current to flow through relay wire 33. The position of switch 34 is controlled by a mechanical connection schematically shown at 35 in Figure 1 to the responder and compensator.

Also in series with the previously mentioned elements is a thermal motor 36 which serves to terminate the toasting cycle, this motor being the subject of applicant's invention. The motor has a shunt switch 34 the position of which is controlled by a mechanical connection 38 from relay wire 33. The circuit is also provided with a main switch 39 in series with supply lead 22, and a mechanical connection schematically indicated at 41 exists between motor 36 and switch 39.

In reviewing the operation of the toaster circuit thus far described, it should be kept in mind that the function of the interval control mechanism is more completely described in the above-mentioned copending applications. When the toaster is at rest before initiation of a toasting cycle, main switch 39 is open, as is control switch 34. Relay switch 37 is closed. Upon insertion of one or two slices of bread, main switch 39 is closed. The particular manner in which this switch is closed in the present embodiment is described in detail below, although it does not form part of the invention. Heating elements 23–26 are energized, and the connection 35 between the responder and compensator and control switch 34 causes immediate closing of this control switch. Relay wire 33 is thus shunted and remains deenergized, so that relay switch 37 remains closed. As the color of the bread surface becomes darker, senser 27 increases its resistance due to its temperature rise, thus causing a corresponding increase in the current passing through responder 28. The arrangement of the control mechanism, and particularly the connection between the responder 28, compensator 29, and control switch 34, is such that when the proper toast color is reached switch 34 will open. The subsequent current passing through relay wire 33 will cause this wire to expand, opening relay switch 37 through mechanical connection 38. When switch 37 is opened thermal motor 36 will be energized, causing opening of main switch 39 through connection 41 and termination of the toasting cycle.

Figure 4:
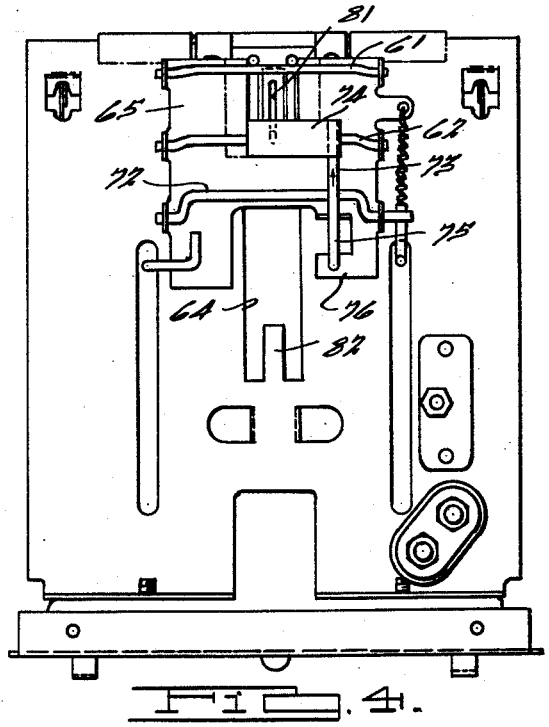
Figure 4 is an end elevational view looking in the direction of the arrow 4 in Figure 3, showing the connection between the bread supports and the parallel arm linkage.
Figure 5:
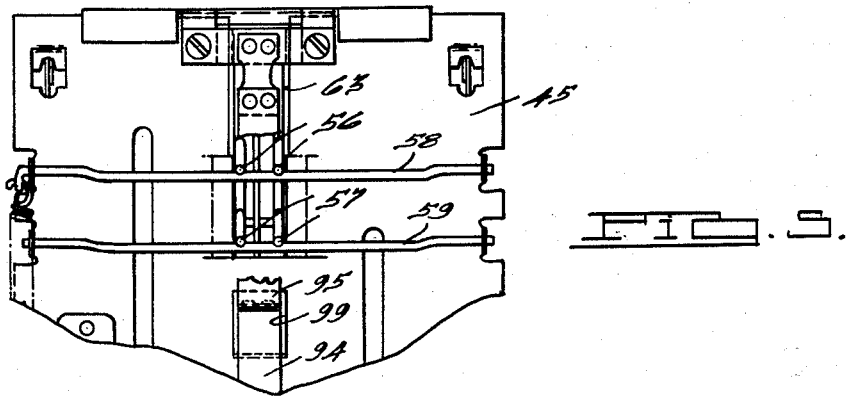
Figure 5 is an end elevational view looking in the direction of the arrow 5 in Figure 3, showing the biasing spring for the parallel arm linkage as well as the disposition of the interval control unit.
Figure 6:
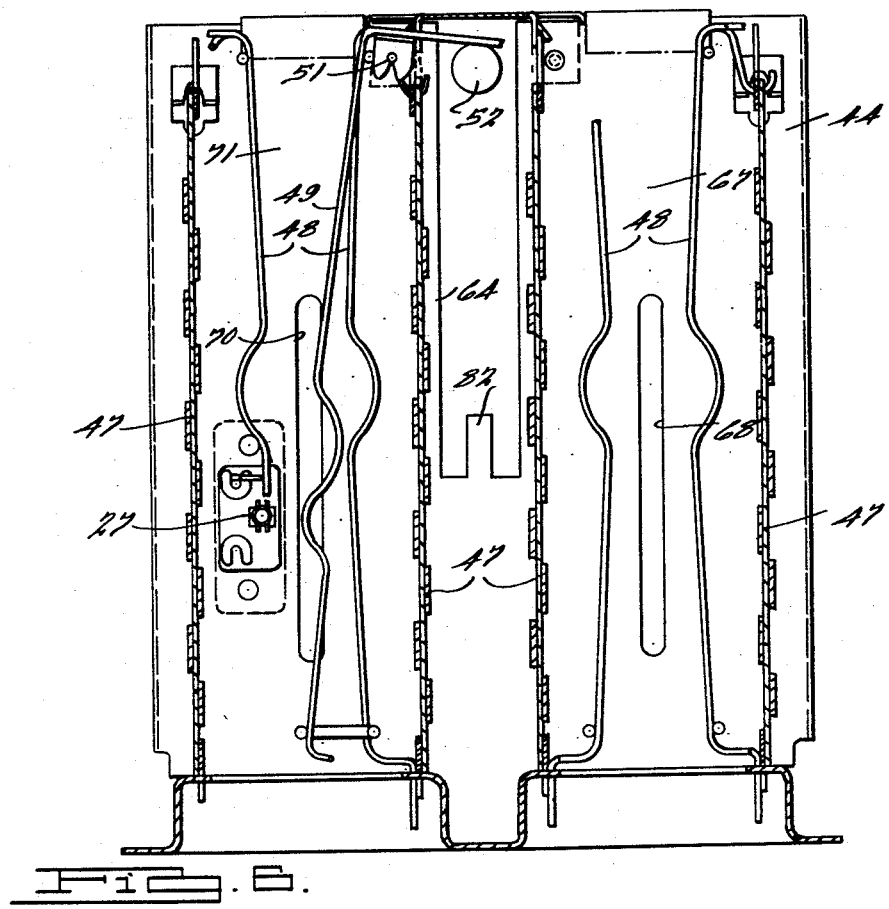
Figure 6 is a cross-sectional view taken along the line 6—6 of Figure 3, showing the guiding means and the disposition of the senser, parts being omitted for clarity.

Figures 2 to 9 illustrate an automatic toaster which embodies the thermal motor of applicant's invention, it being understood that the motor could also be utilized in other environments. The outer casing shell of the toaster is removed in the figures, and the toaster comprises a base 42 on which is mounted a frame generally indicated at 43. Frame 43 is provided with a pair of upright side portions 44 and 45, and a top portion 46 extending between the uprights. Flat heater units 47 carrying heating elements 23 to 26 are vertically mounted within the confines of frame 43, and a plurality of guard wires 48 are also mounted therein. Senser 27 is mounted adjacent one of the toasting chambers as seen in Figure 6, and a biasing member 49 is disposed opposite senser 27 to urge a bread slice against the senser. Member 49 is pivoted at 51 and carries a counterweight 52 on an extension thereof, this counterweight urging member 49 clockwise or to the left in Figure 6. The lower ends of uprights 44 and 45 are secured by bolts 53 to base 42, and a control mechanism generally indicated at 54 is secured to upright 45 by a bracket 55. The control mechanism includes responder 28, compensator 29, shunt 31, relay wire 33, control switch 34 and relay switch 37. Since these elements in themselves do not form part of the present invention, their constructional arrangement is not described in detail.

Figure 3:
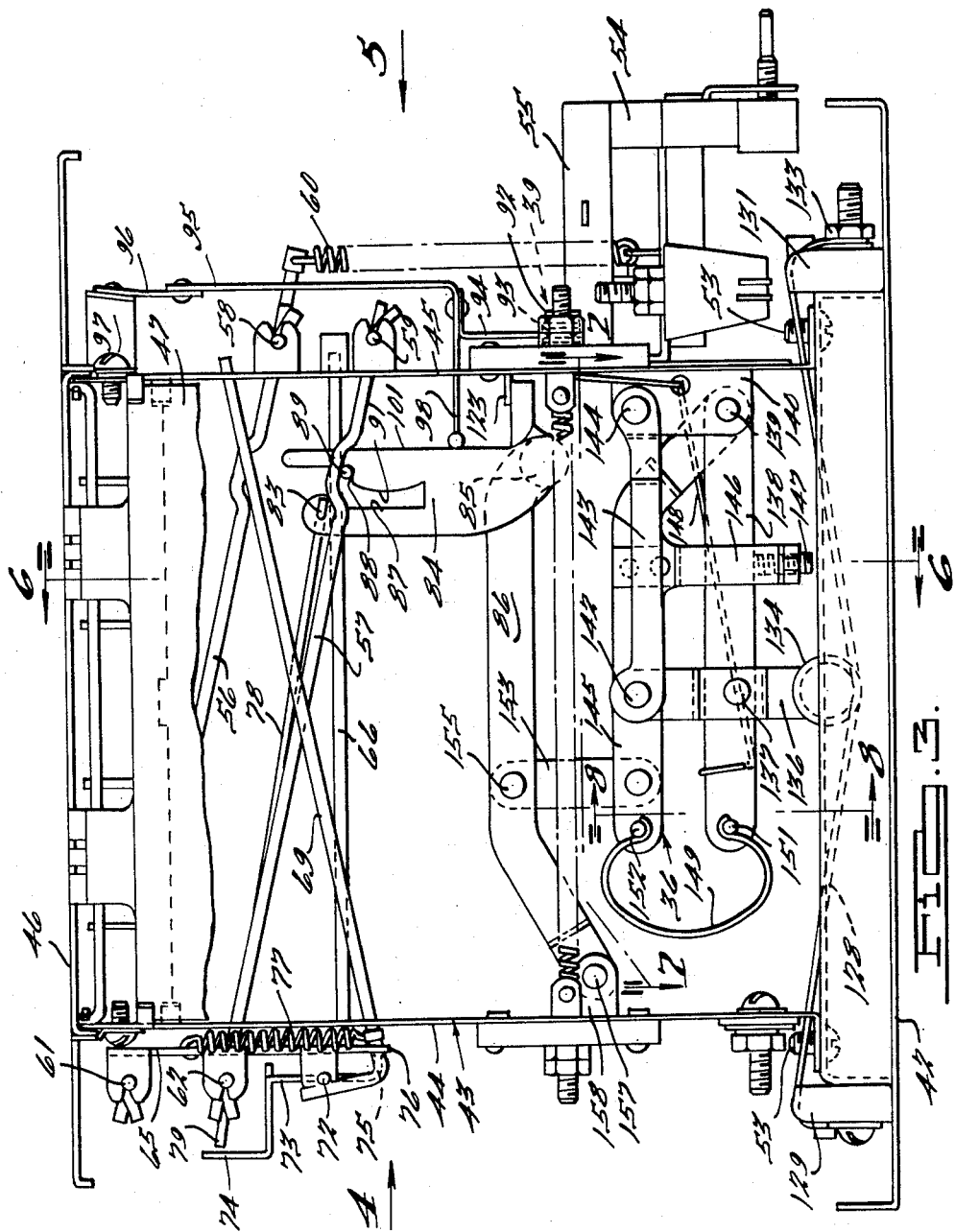
Figure 3 is a side elevational view of the toaster showing the disposition of the thermal motor and its connection to the operating linkage, as well as the stress limiting means for the motor.

The bread carriage comprises a pair of parallel links 56 and 57 which are pivoted at ends 58 and 59 respectively to frame upright 45. A counterbalancing spring 60 connected to the toaster frame urges links 56 and 57 into their upper position. As seen in Figures 3 and 5, each link comprises a pair of parallel wires which are rigidly connected at one end to their respective pivots and at their opposite ends to cross bars 61 and 62 respectively. Pivots 58 and 59 and cross bars 61 and 62 are disposed outwardly of frame uprights 45 and 44 respectively. A slot 63, seen in Figure 5, is provided in upright 45 and a slot 64 is provided in upright 44, links 56 and 57 passing through these slots. A carriage plate 65 is carried by cross bars 61 and 62 in a vertical position, this plate retaining the parallelism of links 56 and 57 throughout their swinging movement about pivots 58 and 59. Carriage plate 65 has a bread support 66 rigidly secured thereto as seen in Figure 3, this support extending into the right hand chamber 67 of Figure 6 through a slot 68 in upright 44. A bread acceptor 69 is also carried by carriage plate 65 and extends through a slot 70 in upright 44 into the left hand chamber 71 seen in Figure 6. Acceptor 69 is carried by a cross bar 72 pivoted to carriage plate 65. Cross bar 72 has an upraised central portion as seen in Figure 4 to which is secured a pusher bar 73 carrying a pusher plate 74. The lower end 75 of pusher bar 73 is engageable with a stop surface 76 of carriage plate 65. With this arrangement, bread acceptor 69 is swingable between an upper or unloaded position shown in Figure 3 and a lower or loaded position. A spring 77 urges acceptor 69 into its unloaded position as determined by the engagement of extension 75 with stop surface 76, spring 77 being yieldable under the influence of the weight of a bread slice to permit lowering of the bread acceptor.

Pusher plate 74 cooperates with a slidable rod 78 disposed between chamber 67 and 71. One end 79 of rod 78 is supported by slotted portion 81 of carriage plate 65, the slotted portion permitting limited vertical movement of this end of the rod. When in its lower position as shown in Figure 3, end 79 of the rod is in position to be engaged by pusher plate 74, whereas in its upper position within slotted portion 81, rod end 79 is clear of the swinging movement of the pusher plate. A tripping extention 82 at the lower end of slot 64 in upright 44 is engageable with rod end 79 when carriage plate 76 is lowered. If pusher plate 74 is moved under rod end 79 while the latter is supported by extension 82, the rod end will not drop back into its lower position until pusher plate 74 is retracted.

The inner end 83 of rod 78 is pivotally secured to the upper end of a cam 84, the lower end of this cam being pivotally supported at 85 by a link 86. The arrangement is such that when rod 78 is urged to the right under the influence of pusher plate 74, cam 84 will be swung to the right as seen in Figure 3. Cam 84 is provided with a slot 87 in its upper portion, this slot having a shoulder 88 on one side thereof. Lower link 57 carries a cross pin 89 which is engageable with shoulder 88 in such manner that the shoulder will support the parallel arm linkage. If shoulder 88 is withdrawn from pin 89 the parallel arm linkage and bread carriage is permitted to drop, spring 60 being too weak to restain this movement under the force of gravity. If cam 84 is swung to the right in Figure 3 and the carriage mechanism drops, pin 89 will ride along a cam surface 91 below shoulder 88. The configuration of this cam shoulder is such that cam 84 will be urged further to the right.

Main switch 39 of the toaster comprises a stationary contact 92 and a movable contact 93 disposed outside upright 45. The movable contact is carried by a leaf spring 94 the upper end of which is secured to a rigid bar 95. The upper end of bar 95 is in turn secured to a leaf spring 96, the last-mentioned leaf spring being secured to upright 45 by a bracket 97. An actuating bar 98 on the lower end of member 95 extends through a slot 99 in upright 45 and is engageable by outer surface 101 of cam 84. Clockwise movement of cam 84 (to the right in Figure 3) urges bar 95 and thus contact 93 to the right, closing switch 39. Thus, movement of rod 78 to the right in Figure 3 when a bread slice is placed on acceptor 59 will close switch 39, and the rightward camming action of pin 89 on cam 84 as the carriage mechanism drops will cause further engagement of contacts 92 and 93. Springs 94 and 96 will aid in maintaining this contact and will supply the necessary wiping action for an efficient electrical connection.

The position of the carriage mechanism during the toasting cycle is such that pin 89 is in the lower end of slot 87. Thermal motor 36 comprises means for lowering cam 84 at the end of the toasting cycle sufficiently to cause shoulder 88 to snap under pin 89 under the influence of springs 94 and 96. The motor is also capable of lifting cam 84 as it supports the carriage mechanism until the toasted slices emerge from the upper portion of the toaster. This action is accomplished within a matter of a few seconds at the end of the toasting cycle by means of the rapid expansion and contraction of the wires in the thermal motor. The expansion of the wires causes lowering of cam 84 until shoulder 88 snaps under pin 89. This movement causes opening of main switch 39. The subsequent rapid cooling of the wires in thermal motor 36 lifts cam 84 with the carriage mechanism.

Figure 7:
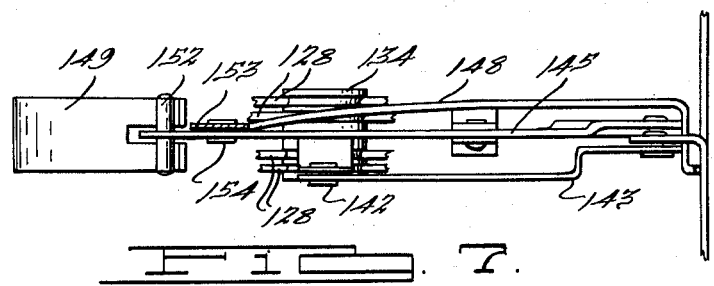
Figure 7 is a plan view taken in cross section along the line 7—7 of Figure 3 and showing the relative positions of the various links and arms.

Thermal motor 36 comprises a plurality of wires 128 in parallel relation in the lower portion of the toaster. These wires (four in number in the illustrated embodiment) are secured to insulative blocks 129 and 131 respectively, the blocks being fixed to base 42 so that wires 128 are suspended therebetween. The wires may be looped with terminals 133 provided for connection to the remainder of the circuit. Wires 128 are preferably of such length that when in their cold condition they will have a certain amount of slack as shown in Figure 3. A spool 134 engages wires 128 transversely at their central portions, the spool being provided with grooves 135 as shown in Figure 7 for retaining the wires. Spool 134 is secured to the lower end of a vertical arm 136 which is pivotally mounted at 137 on a link 138. This link is mounted for pivotal movement at 139 on a fixed bracket 140 on toaster frame 43. The upper end of arm 136 is pivoted at 142 to one end of a link 143 which is parallel to link 138 and is pivotally mounted at 144 on bracket 140. Links 138 and 143 together with arm 136 thus constitute a parallelogram linkage, maintaining the vertical position of arm 136 throughout its range of movement.

An arm 145 is pivoted at 139 to bracket 140 independently of link 138. Arm 145 has a portion which extends angularly upwardly from pivot point 139 and another portion which extends in parallel relation with link 138. An extension 146 on arm 145 projects downwardly and carries a set screw 147 at the lower end thereof, the upper end of this set screw being engageable by the lower surface of link 138. With this one-way positive driving connection, downward or counterclockwise movement of link 138 will cause downward movement of arm 145, but link 138 is free to move upwardly without interference from set screw 147. A spring 148 mounted on bracket 140 engages link 138 to urge it against set screw 147. There is thus a positive driving connection between spring 148 and arm 145 when the spring is permitted to expand. Another connection between link 138 and arm 145 comprises a C-shaped leaf spring 149 which engages a pin 151 on link 138 and a pin 152 on arm 145. Spring 149 forms a yieldable connection between link 138 and arm 145 in an upward direction, so that upward movement of link 138 will cause upward movement of arm 145 due to the force transmitted through spring 149. However, should any obstruction prevent upward movement of arm 145, link 138 can still move upwardly, contracting spring 149. There is thus a yieldable driving connection between the means which causes contraction of spring 148 and arm 145, this yieldable driving connection being part of the means which connects spring 148 and arm 145.

A vertical link 153 is pivoted at 154 to arm 145 and extends upwardly, its upper end being pivoted at 155 to an arm 86. The latter is pivotally mounted at 157 to frame 43 by a fixed bracket 158. As mentioned previously, the outer end of arm 86 carries cam 84 by means of pivot 85.

*Operation*

Figure 9:
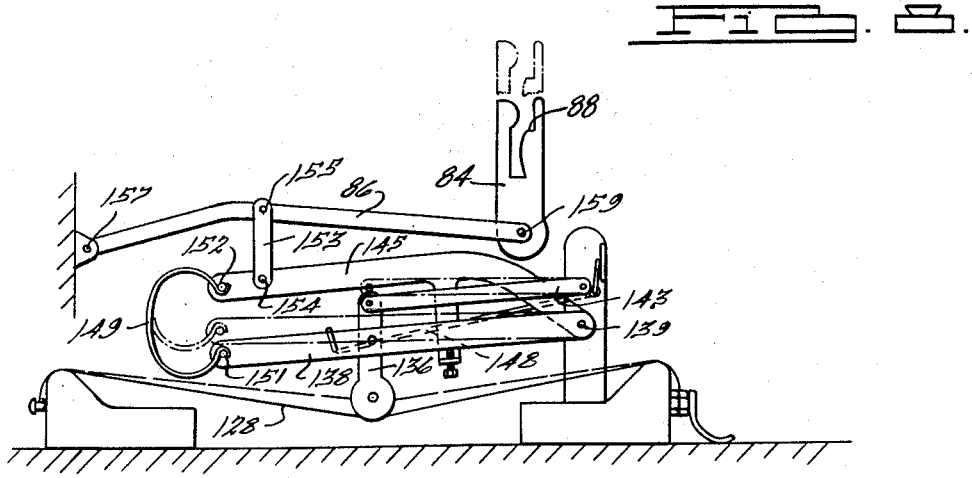
Figure 9 is a schematic view similar to Figure 3 showing the bread carriage in toasting position.

Assuming a starting condition in which the toaster is deenergized and the bread carriage in its upper position, the placing of a bread slice on bread acceptor 69 will cause cam 84 to swing clockwise about pivot 85, allowing the bread carriage to drop into position shown in Figure 9. The toasting cycle will pursue the course described with respect to Figure 1, at the end of which wires 128 will become energized. The expanding wires will sag until they reach the solid line position shown in Figure 9, allowing spool 134 to drop as urged by expanding spring 148. It will be noted that a substantial change in angularity takes place between the contracted and expanded wire positions in Figure 9, the contracted position being shown in dot dash lines. In a typical example, the angularity of each side of each wire 128 with respect to the horizontal could change from about 10° to about 15°. The angle formed by wires 128 at spool 134 will be correspondingly reduced, this angle thus being inversely related to the wire length. The subsequent downward movement of link 138 which engages set screw 147 will cause a similar downward movement of arm 145. Through link 153, arm 86 will also be swung downwardly, the angularity of movement of arm 86 being greater than that of link 145 due to the leverage amplification. Cam 84, connected to the outer end of arm 86, will be moved downwardly a substantially greater distance than the original movement of spool 134, as evidenced by Figure 9. Once shoulder 88 of cam 84 snaps under pin 89, the main switch will be opened to deenergize wires 128.

The subsequent contraction of wires 128 will lift spool 134 together with arm 136, thus swinging link 138 upward and contracting spring 148. The force transmitted through spring 149 will cause upward movement of arm 145 and therefore of arm 86 and cam 84, thus lifting the bread carriage. Should an obstruction prevent upward movement of the bread carriage and therefore of arm 145, link 138 will nevertheless be moved upwardly, compressing spring 149, and there will be no interference with the contraction of wires 128. Upon removal of the obstruction spring 149 will expand, lifting the bread carriage into its toasting position.

An advantage of the wire arrangement in thermal motor 36 is that it automatically decreases the load applied to the wires as they are heated, thus permitting operation of the motor wires at higher stresses. In previously known thermal motor constructions, the strength of the wires which could be utilized has been limited by the fact that the wires are stressed when hot in the same manner in which they are stressed when cold. Since the tensile strength of the wire when hot is less than when cold, the amount of tension which may be placed on each wire would thus be limited by the hot condition, so that the wires are actually understressed when cold. This has required a greater number of wires or larger size wires in a given installation in order to apply a required force to the driven parts.

Figure 10:
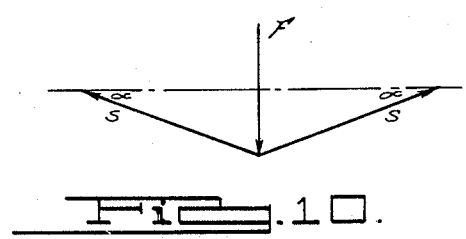
Figure 10 is a force diagram demonstrating the load-carrying properties of the thermal motor wires.
Figure 8:
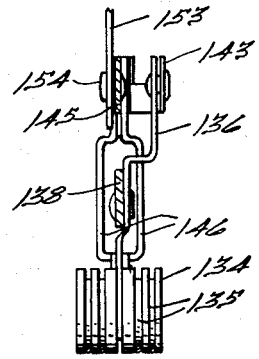
Figure 8 is an elevational view in cross section taken along the line 8—8 of Figure 3 and further disclosing the disposition of the parts.

In thermal motor 36 the configuration of wires 128 changes as it is heated so that the angle which each side of each wire makes with the horizontal increases, and the angle formed by the wire at spool 134 decreases. This means that for a given central load the stress in the wire becomes less. As shown in Figure 10, the stress may be calculated by the following equation:

$$S = \frac{F}{2 \sin \alpha}$$

where $S$ = stress in wire
$F$ = vertical load on wire, and
$\alpha$ = angle between each side of the wire and the horizontal Using this equation, we find for example that with a load F of 3 pounds on each wire, the wire stress S at an angle $\alpha$ of 10° is 8.65 pounds whereas it is 5.8 pounds at an angle $\alpha$ of 15°. This substantial decrease in wire stress means that the toaster parts may be so proportioned as to fully utilize the tensile strength of wires 128 without the danger of overstressing these wires in their hot condition. Fewer wires will thus be needed, contributing to the compactness and low cost of the unit.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a thermal motor, a wire having a predetermined temperature coefficient of expansion, fixed supports for the ends of said wire, a link pivotally supported at one end and extending substantially parallel to said wire, an arm connected at an intermediate portion to said link and engageable transversely with the central portion of said wire, means urging said arm against said wire whereby expansion of said wire permits movement of said link in one direction and contraction of said wire causes movement of said link in the opposite direction, a second arm pivotally supported at one end and extending substantially parallel with said first link, a positive one-way connection between said first link and second arm whereby movement of said first link in said one direction will cause simultaneous movement of said second arm in one direction, a spring connecting said first link and second arm and providing a yieldable one-way connection, whereby movement of said first link in said opposite direction will yieldably move said second arm in the opposite direction, a third arm pivotally supported at one end and extending substantially parallel to said first link and second arm, a second link pivotally connected between the outer portion of said second arm and an intermediate portion of said third arm, and a movable member connected to the outer end of said third arm.

2. In a thermal motor, a wire having a predetermined temperature coefficient of expansion, a mount, end supports fixed to said mount and suspending said wire therebetween, a link pivoted at one end to said mount, an arm pivoted on said link and engageable transversely with the central portion of said wire, a spring urging said arm against said wire, expansion of said wire permitting expansion of said spring and movement of said link in one direction, contraction of said wire causing contraction of said spring and movement of said link in the opposite direction, a movable member, and connecting means between said link and said movable member forming a positive driving connection for said movable member when said link moves in said one direction and a yieldable driving connection for said movable member when said link moves in the opposite direction.

3. In a thermal motor, a wire having a predetermined temperature coefficient of expansion, a mount, end supports on said mount suspending said wire therebetween, a link pivoted to said mount, an arm pivoted to an intermediate portion of said link and engageable transversely with said wire, a spring engageable with said link to urge said arm against said wire, expansion of said wire permitting expansion of said spring and movement of said link in one direction, contraction of said wire causing contraction of said spring and movement of said link in the opposite direction, a second arm pivoted to said mount, a one-way positive driving connection between said link and said second arm when said link moves in said one direction, and a yieldable one-way driving connection between said link and said second arm when said link moves in the opposite direction.

4. The combination according to claim 3, further provided with a second link pivoted on said mount and an extension of said first arm and being parallel to said first link, said first and second links and said first arm forming a parallelogram linkage.

5. In a thermal motor, a wire having a predetermined temperature coefficient of expansion, a mount, end supports fixed to said mount and suspending said wire therebetween, a link pivoted on said mount, an arm carried by said link and engageable with the central portion of said wire, means urging said arm against said wire, expansion of said wire permitting simultaneous movement of said arm in one direction and contraction of said wire causing simultaneous movement of said arm in the opposite direction, a movable member, and connecting means independent of said wire between said link and said movable member forming a positive driving connection for said movable member when said arm moves in said one direction and a yieldable driving connection for said movable member when said arm moves in the opposite direction.

References Cited in the file of this patent
UNITED STATES PATENTS

| | | |
|---|---|---|
| 847,543 | Batault | Mar. 19, 1907 |
| 1,638,410 | Robertshaw | Aug. 9, 1927 |
| 1,692,629 | Dalen | Nov. 20, 1928 |
| 1,783,474 | Hotchkiss | Dec. 2, 1930 |